Sept. 15, 1936.  P. C. DAY  2,054,782
GEARED POWER UNIT FOR OIL WELLS
Filed Aug. 11, 1933
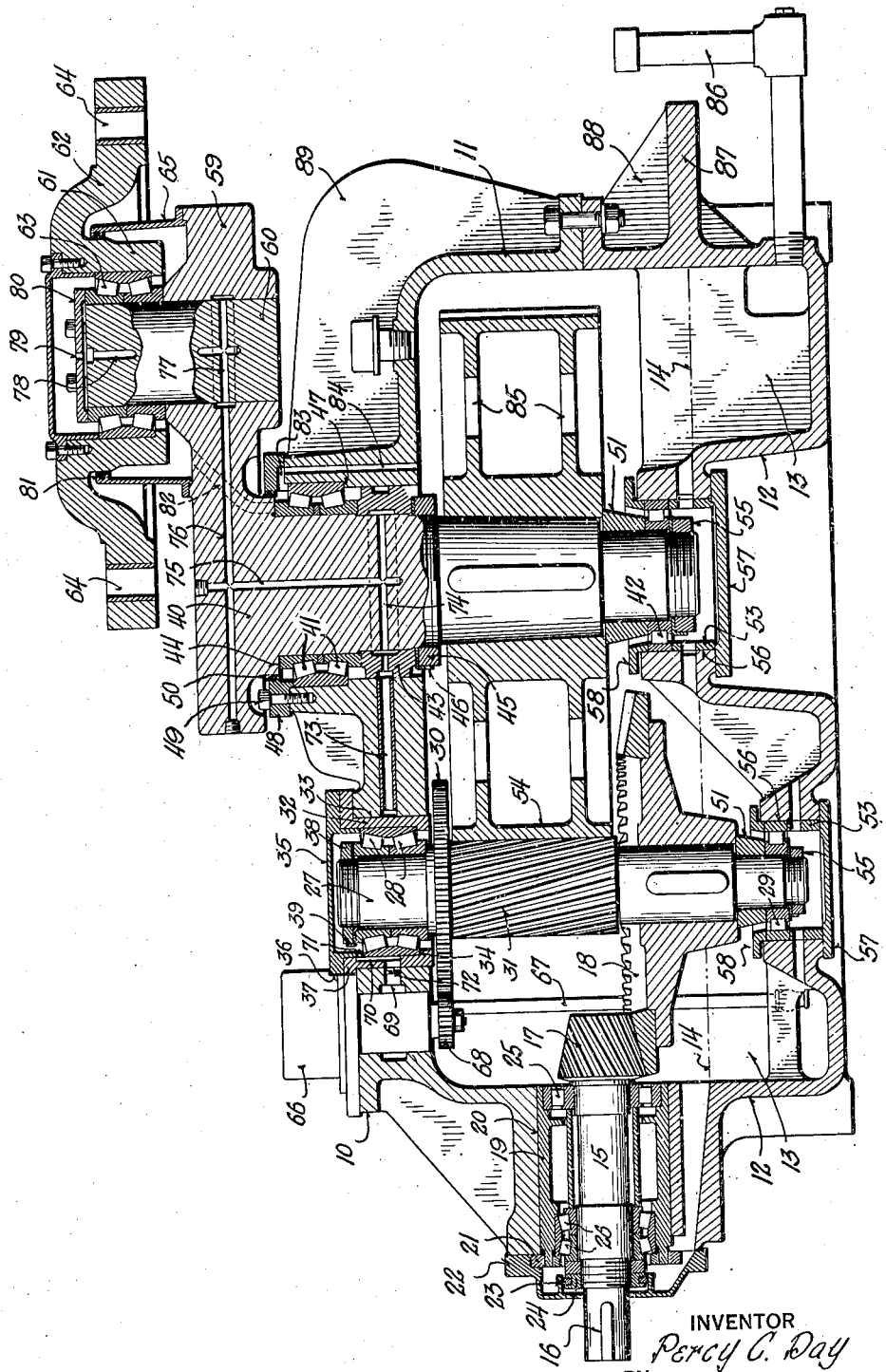
INVENTOR
Percy C. Day
BY
[signature]
ATTORNEY Patented Sept. 15, 1936

2,054,782

UNITED STATES PATENT OFFICE 2,054,782

GEARED POWER UNIT FOR OIL WELLS

Percy C. Day, Milwaukee, Wis., assignor to The Falk Corporation, Milwaukee, Wis., a corporation of Wisconsin Application August 11, 1933, Serial No. 684,629

1 Claim. (Cl. 184—6)

This invention relates to a central driving unit for multiple oilwell pumps.

It is common practice in the oil fields to drive several pumps from a single operating head connected thereto through suitable cables. The head is generally horizontally supported in an open frame for gyration about a vertical axis and is commonly driven at rather low speed through belting or other gearing which requires frequent lubrication and other attention to properly maintain the same.

An object of the present invention is to provide an improved self-contained driving unit for the purpose in which the operating head is ruggedly supported and efficiently driven by means requiring minimum attention. This I accomplish by the provision of a housing forming a tight enclosure for an improved speed reduction gearing and also forming a rugged support for an external crank or eccentric driven by the gearing and supporting and actuating the driving head. Provision is also preferably made for an adequate self-lubrication of all of the operating parts, including the external crank or eccentric, from a supply of lubricant contained in the housing.

Another more specific object is to provide a lubricant circulating system which will automatically maintain, without loss, an adequate supply of lubricant at the external crank or eccentric.

Another object is to provide an improved means for supporting and sustaining the shaft of the unit in accurate positional relationship and at the same time automatically compensate for relative variations due to expansion or contraction of the shafting or housing as a result of temperature fluctuations. This feature is of considerable importance in a unit of the large size contemplated and intended for out-of-door use and in climates where temperatures vary through a relatively wide range. By thus accommodating or compensating for such variations, overloading of the bearings with consequent damage thereto or to the housing is avoided.

Other objects and advantages will appear, expressed or implied, from the following description of a driving unit constructed in accordance with the present invention.

The single figure of the accompanying drawing is a vertical longitudinal sectional view of a driving unit embodying this invention.

The unit shown comprises a housing 10 which encloses the major portion of the working elements. The housing 10 is split horizontally into the upper housing 11 and the lower housing 12. The lower portion of the lower housing 12 forms an oil sump 13 which is filled with oil to a level indicated by line 14.

Journalled in one end of the housing 10 is a high speed driving shaft 15 to which power may be applied in any convenient manner at its exposed end 16. The inner end of the shaft 15 carries a helical bevel pinion 17. This shaft 15 is preferably mounted to permit axial adjustment thereof to effect and maintain a proper working relation between the gear 17 and the gear 18 with which it meshes.

For this purpose the shaft 15 is mounted within a sleeve 19 snugly fitted within a cylindrical opening 20 in the housing 10. The sleeve 19 is fixed in place by means of an internally threaded ring 21 which engages with external threads on the end of the sleeve 19. The axial adjustment of the shaft 15 is effected by turning the ring 21 in respect to the sleeve 19. Ring 21 is fixed in place by a bearing cover 22 which is clamped to the housing 10 and overlaps the ring 21. This bearing cover 22 also carries the oil seal 23 which engages with the grooved ring 24 on the shaft 15. The inner end of the shaft 15 is supported by a roller bearing 25 seated in the inner end of the sleeve 19, and the outer end of the shaft 15 is supported within a pair of tapered roller bearings 26 seated in the outer end of the sleeve 19 and capable of sustaining the radial as well as the end thrust of the shaft 15.

Also journalled in the housing 10 is a vertical intermediate shaft 27 which is supported at its ends by an upper double end-thrust tapered roller bearing 28 and a lower roller bearing 29. This shaft carries a gear 30, the helical pinion 31 and the helical bevel gear 18 which meshes with and is driven by the helical bevel pinion 17. The upper bearing 28 of the shaft 27 is preferably removably mounted in the top of the casing and serves to adjustably fix the shaft 27 in position to maintain a proper working relation between the bevel gear 18 and the bevel pinion 17.

For this purpose the upper bearing 28 is supported in a sleeve 32 fitted into the cylindrical opening 33 in the housing 10. The outer race ring of the bearing 28 is confined between an internal shoulder 34 in the sleeve 32 and a bearing cover 35 which has an attaching flange 36 applied over a flange 37 on the sleeve 32. The inner race rings are confined between the hub of the gear wheel 30 and a threaded nut 38 on the end of the shaft 27. This nut 38 is secured by lock washer 39. This bearing 28 functions to sustain the radial thrust as well as the end thrust of the shaft 27 in both directions. The axial adjustment of the shaft 27 may be effected by inserting shims beneath the flange 37.

Also journalled in the housing is a crank shaft 40 which is supported by the upper bearing 41 and the lower bearing 42. The bearing 41 is shown similar to the upper bearing 28 of shaft 27. The inner race rings of the bearing 41 together with an oil collector ring 44 are confined between a shoulder 44 of the crank shaft 40 and a threaded nut 45 which is secured on the crank shaft 40 by the lock washer 46. The outer race ring of the bearing 41 is removably confined in the housing 10 between an internal shoulder 47 and a retaining ring 48 which is shown attached to the housing by cap screws 49. An oil seal 50 prevents grit and dust from entering and contaminating the oil supply.

The lower bearings 29 and 42 of the shafts 27 and 40 are of the well known non-tapered roller type and are substantially similar, like parts being designated by the same numbers. The inner races of the bearings 29 and 42, together with the tapered spacer rings 51, are confined on their respective shafts 27 and 40 between the hubs of the respective gears 18 and 54 and threaded nuts 55 on the ends of the shafts. The outer races, together with perforated spacer rings 53 are confined in each instance in a cylindrical opening 56 in the housing 10 between a cover plate 57 and a flanged ring 58, both of which are appropriately secured to the housing 10.

It will be noted that although the lower bearings 29 and 42 are fixed to their respective shafts they are not otherwise restrained against axial displacement within their respective outer race rings, so that the lower end of each shaft is thus free to float axially within to the lower section 12 of the housing. Thus, each shaft, though accurately positioned by its upper bearing 28 or 41, is free to axially expand or contract within the casing, and the casing is likewise free to vertically expand or contract relative to those shafts without imposing an end thrust thereon or loading the bearings.

On the crank shaft 40 is a large helical gear 54 which meshes with and is driven by the helical pinion 31. The shaft 40 extends upwardly through the cover 11 of the housing and carries an external crank arm 59 having a vertical crank pin 60 fixed therein. The pin 60 projects upwardly into and supports the depending hub 61 of a circular pump operating head 62, a double end-thrust journal bearing 63, similar to the bearings 28 and 41 hereinabove described, being provided between the pin and hub. The periphery of the head 62 is preferably depressed into the plane of the bearing 63 and provided with a series of holes 64 for the receipt of shackle pins (not shown) or other appropriate means for connecting the several pump operating cables to the head.

An upstanding cylindrical shield 65, seated on the crank arm 59 and surrounding the hub 61 of the head, provides a catch basin for lubricant discharged from the bearing 63.

In the unit shown, all operating parts are automatically lubricated by oil supplied from the sump 13.

The pinion 31 and gear 54 are lubricated by lubricant sprayed thereon from a gear pump 66 of a well known type, substantially in the manner described in the copending application of myself and Walter P. Schmitter, Serial No. 487,708, filed October 10, 1930, the pump receiving its supply from the sump 13 through a pipe 67. The pinion 17 and gear 18 are lubricated by lubricant received from the pinion 31 and gear 54. The bearings 25 and 26 of the pinion shaft 15 are lubricated substantially in the manner described in the prior patent to Walter P. Schmitter, No. 1,894,927 by lubricant thrown from the pinions and gears. The lower bearing 29 is lubricated by immersion in the oil supply in the sump 13, and the lower bearing 42 is lubricated by oil drippings from the gear 54.

The pump 66, which is driven from the gear 30 through a pinion 68, also supplies lubricant to the several bearings 28, 41, and 63 preferably in the manner which will now be described. It discharges into a passage 69 and, from there, part of the oil passes upwardly through a narrow duct 70 and through a hole 71 to the top of the bearing 28. After circulating through this bearing 28, this oil discharges onto the gear 30 to lubricate the same and the pinion 68.

The remainder of the oil in the passage 69 flows around the sleeve 32 through a circular channel 72 cut into the housing 11, then through a duct 73 into the oil distributing ring 43, and thence through ducts 74, 75, and 76 in the crank shaft 40 and ducts 77 and 78 in the pin 60, and finally through a hole 79 in a retaining cover 80 to the top of the bearings 63. After circulating through the bearing 63, the oil discharges into the basin formed by the shield 65.

The shield 65 extends upwardly a sufficient distance to retain the oil against the centrifugal effect of the rotating crank arm 59 and is preferably sealed against the hub 62 by a felt washer 81. This washer 81 seals the oil supply from dust and other contamination from the outside. The crank shaft revolves rather slowly so that the oil remains in the bottom of the basin and does not ordinarily rise against the felt washer 81 by centrifugal force.

The oil discharges from the basin through a duct 82 in the crank arm 59 and flows into the bearing 41, the excess oil discharging through the overflow ducts 83 and 84, the openings 85 in the web of the gear wheel 54 into the lower bearing 42 of the crank shaft 40 and from there back into the oil sump 13.

It will thus be noted that the external crank pin bearing is adequately lubricated by oil circulated through it, without loss, from and back to the housing, thereby making it possible to lubricate this external bearing from the same source from which those bearings within the housing are lubricated. By this arrangement adequate lubrication of all of the parts is assured so long as sufficient oil is maintained in the housing, and this requires only occasional inspection of the oil level within the external filler pipe 86 which is in open communication with the base of the housing.

It will also be noted that the housing 10 not only serves as an oil reservoir and as a dust proof enclosure for the gearing, but also provides an adequate support for sustaining the severe loads imposed on the operating head 62 and the crank shaft 40. The base of the housing is intended to be countersunk into an appropriate foundation of cement or the like and is preferably provided with a heavy horizontal external flange 87 surrounding the same and adapted to seat upon the foundation to rigidly brace the housing. The flange 87 is braced by vertical webs 88, and a series of external webs 89 which radiate from the crank shaft bearing hub on the upper half of the housing, reinforce the same, and serve as an additional brace for the crank shaft.

Various changes may be made in the specific embodiment of the invention hereinabove specifically described without departing from or sacrificing the advantages of the invention as defined in the appended claim.

I claim:—

A driving unit comprising a housing having an oil reservoir therein, a vertical shaft journalled therein and projecting upwardly therefrom, speed reduction gearing in said housing for driving said shaft, a crank fixed to the projecting end of said shaft, a vertical crank pin on said crank, a driven member journalled on said pin, said member having a depending hub, means for delivering oil from said reservoir to and between said pin and member to lubricate the same, means encircling said hub and forming an auxiliary reservoir to receive oil discharged from said member, and means for returning oil from said auxiliary reservoir to said housing.

PERCY C. DAY.